US006796538B2

(12) United States Patent
Hsu et al.

(10) Patent No.: US 6,796,538 B2
(45) Date of Patent: Sep. 28, 2004

(54) ADJUSTING DEVICE

(75) Inventors: Shin-Lung Hsu, Taoyuan (TW);
Hung-Cheng Lee, Junghe (TW);
Hung-Wen Liu, Taoyuan (TW);
Ying-Yu Lin, Ilan (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/314,363

(22) Filed: Dec. 9, 2002

(65) Prior Publication Data

US 2003/0106972 A1 Jun. 12, 2003

(30) Foreign Application Priority Data

Dec. 12, 2001 (TW) ........................................ 90130843 A (51) Int. Cl.⁷ .............................................. F16M 11/24
(52) U.S. Cl. ............................... 248/188.2; 248/188.4; 248/354.7; 248/677; 248/688; 248/423; 353/119; 353/70
(58) Field of Search ........................... 248/188.2, 188.3, 248/188.4, 188.5, 188.8, 354.1, 354.5, 354.7, 649, 688, 677, 408, 409, 423; 353/119, 70, 122

(56) References Cited

U.S. PATENT DOCUMENTS

| | | | | | |
|---|---|---|---|---|---|
| 2,302,134 | A | * | 11/1942 | McNabb | ..................... 248/649 |
| 2,809,553 | A | * | 10/1957 | Van Den Broek | .......... 353/119 |
| 3,938,798 | A | * | 2/1976 | Solie et al. | ................... 269/20 |
| 5,664,758 | A | * | 9/1997 | Smith | ........................ 248/688 |
| 5,762,303 | A | * | 6/1998 | Chae | ........................ 248/188.4 |
| 5,836,556 | A | * | 11/1998 | Kim | ........................ 248/188.4 |
| 6,302,543 | B1 | * | 10/2001 | Arai et al. | ..................... 353/70 |
| 6,461,002 | B1 | * | 10/2002 | Su | ............................. 353/119 |
| 6,685,149 | B1 | * | 2/2004 | Chang | ..................... 248/188.2 |
| 2002/0139908 | A1 | * | 10/2002 | Oyama et al. | ........... 248/188.8 |
| 2002/0139909 | A1 | * | 10/2002 | Oyama et al. | ........... 248/188.8 |

FOREIGN PATENT DOCUMENTS

| | | | | |
|---|---|---|---|---|
| JP | 09054370 A | * | 2/1997 | |
| JP | 10002485 A | * | 1/1998 | |
| JP | 10332077 A | * | 12/1998 | |
| JP | 11271879 A | * | 10/1999 | |
| JP | 2000241875 A | * | 9/2000 | |

* cited by examiner

Primary Examiner—Leslie A. Braun
Assistant Examiner—Naschica S. Morrison
(74) Attorney, Agent, or Firm—Rabin & Berdo, P.C.

(57) ABSTRACT

An adjusting device comprising a foot member, a supporting member, and a moving member. The supporting member is fixed to the foot member, and the moving member includes at least a moving body, an elastic device and a button. The moving body includes two passageways, one of which is sized to receive the supporting member so that the moving body can move vertically and is coupled to the supporting member, and the other of which is sized to receive the elastic device so that the elasticity of the elastic device embeds in the passageway horizontally to clip to the supporting member so that the moving body is fixed to the supporting member. The button is movable horizontally or vertically and is buckled to the moving body, through which the user can impose a force horizontally or vertically to deform the elastic device, so that the elastic device can disengage from the supporting member for the adjustment.

11 Claims, 8 Drawing Sheets

ADJUSTING DEVICE

This application incorporates by reference Taiwan application Serial No.090130843, filed Dec. 12, 2001.

BACKGROUND OF THE INVENTION

1. Field of the Invention

The invention relates in general to an adjusting device, and more particularly to an adjusting device including a foot member, a supporting member, and a moving member.

2. Description of the Related Art

When equipping a projector on a desk, the user can make use of the adjusting foot or the adjusting device to adjust the angle of elevation so that the projector can cast images on the designated screen.

Figure 1:
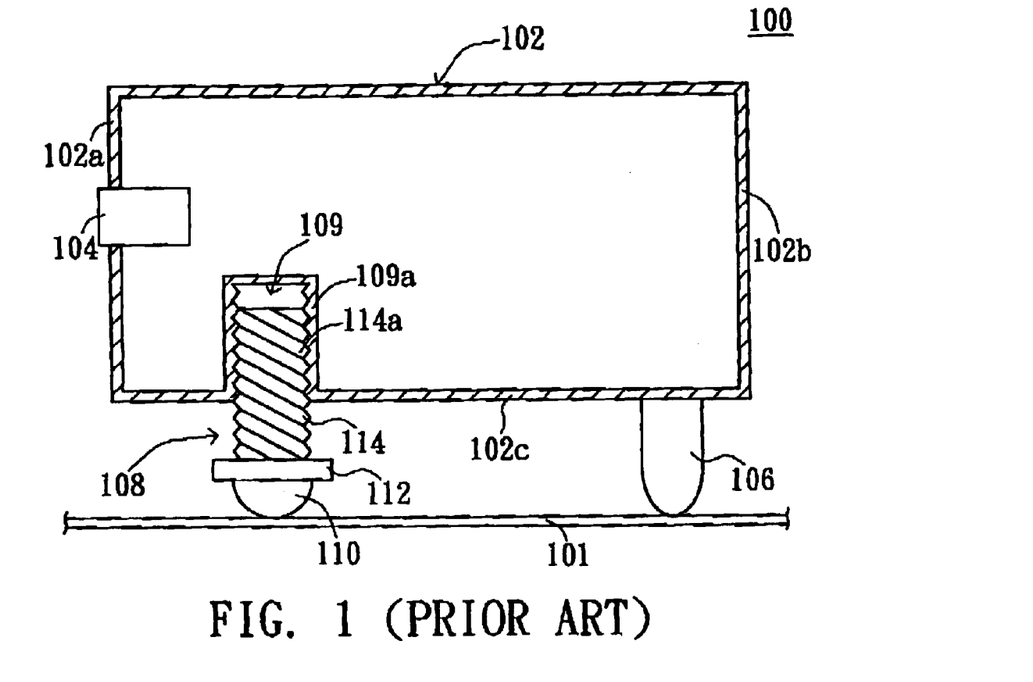
FIG. 1 (Prior Art) shows a projector on a projection plate.

Referring to FIG. 1, a projector 100 on a projection plate 101 is shown, wherein a fixed foot 106 is under and coupled to the base-board 102c at the end near the rear-board 102b of the housing. At the other end of the base-board 102c, near the front-board 102a, there is an adjusting foot 108. The adjusting foot 108 is installed inside a fillister 109 of the housing 102 with a portion of the adjusting foot 108 exposed. The upward and downward movement of the front side of the projector 100 is controlled by the adjusting foot 108.

In addition, the adjusting foot 108 includes the supporting member 110, the turning member 112, and the spiral member 114. The adjusting foot 108 supported by the supporting member 110 is against the projection plate 101. The turning member 112 is installed on the top of the supporting member 110, which provides the function of rotating. The supporting member 110, the turning member 112, and the spiral member 114 are coupled and thus, the rotation of the turning members 112 leads the rotation of the other two members in the same direction. As the thread 114a of the spiral member 114 and the thread 109a of the edge of the fillister 109 are in mesh, the spiral member 114 and the fillister 109 are mounted properly. Therefore, by rotating the turning member 112, the elevation angle of the projector 100 can be adjusted.

A portion of the weight of the projector 100 is imposed on the supporting member 110, so that a frictional force is generated between the supporting member 110 and the projection plate 101. Therefore, to rotate the adjusting foot 108 efficiently, the user must exert a force great enough to overcome the frictional force, which can be very laborious. Additionally, it is quite inconvenient for the user who must spend much time to adjust the projector 100 to the required angle because the adjustment range is very limited. The user may need to rotate the adjusting foot 108 several times so as to adjust the angle of the projector 100 slightly upward or downward.

Figure 2:
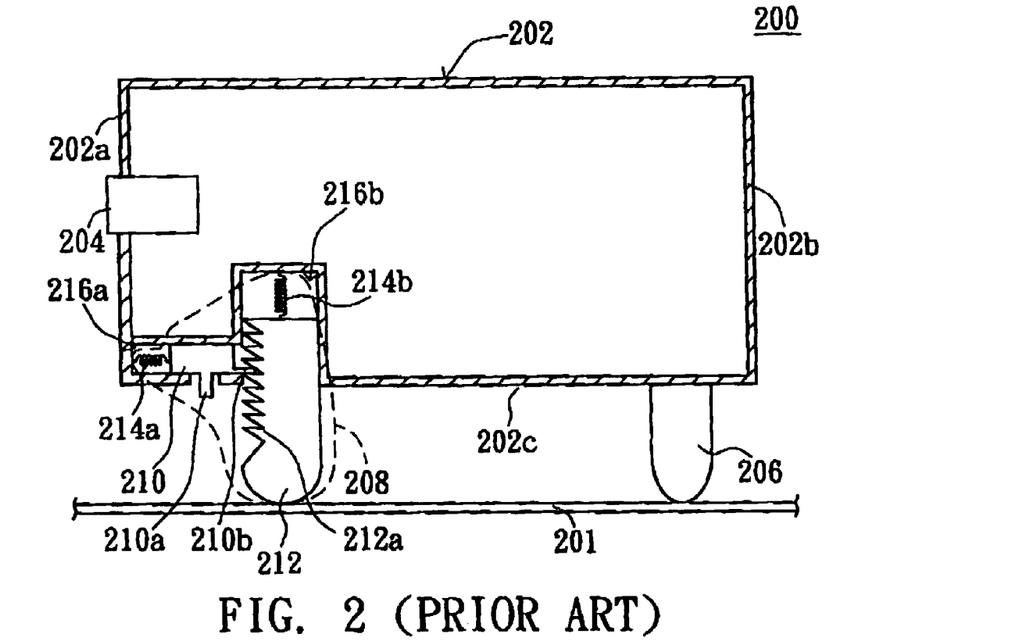
FIG. 2 (Prior Art) shows an adjusting device including a leg part, springs, and a locking part.

Referring to FIG. 2, it shows an adjusting device comprising a locking part, springs, and a leg part, as disclosed in Japanese Patent Publication number 11-271879. As shown in FIG. 2, a fixed foot 206 is under the base-board 202c coupled to the rear-board 202b of the housing 202. At the other side of the base board 202c near the front-board 202a, there is a projector device 208. The projector 200 is installed stably on the projection plate 201 by the support of the fixed foot 206 and the projector device 208.

The projector device 208 is provided with a leg part height adjusting mechanism comprising the leg part 212, a spring 214b, and a locking part 210, wherein the leg part 212 is freely and vertically movable from the inside to the outside of a hole part 216b formed in the housing 202 base plate 202c of the projector device. The spring 214b is for pushing the leg part 212 downward, and the locking part 210 is for locking the leg part 212 pushed down by the spring 214b at a desired level. Thus, by operating the locking part 210, the height of the leg part 212 is set so that the projector device can be positioned at the desired level.

The shortcoming and deficiency of the conventional adjusting mechanism lie in the inconvenience of the operating procedure to adjust the angle of elevation of the projector 200. When adjusting the angle of the projector 200 on the projection plate 201, the user must support the projector 200 with one hand and pull the locking part 210 to the left with the other hand to separate the moving part 210b off the sawtooth part 212a. And the elasticity of the spring 214b will force the leg part 212 to move outside of the hole part 216b; meanwhile the user adjusts the projector 200 upward or downward to the required angle with a certain length of the leg part 212 exposed outside of the hole part 216b, and by then the user can set free the locking part 210 so that the moving part 210b and the sawtooth part 212a will mesh again.

SUMMARY OF THE INVENTION

The present invention overcomes the shortcoming and deficiency mentioned above by providing an adjusting device, having a well-designed supporting member and moving member, so that the user can easily adjust the position of the moving member connected with the supporting member.

Accordingly, an object of the present invention is to provide an adjusting device comprising a foot member, a supporting member, and a moving member. The supporting member is fixed to the foot member, and the moving member includes a moving body, a supporting body and a button. Furthermore, the moving body includes two passageways. One passageway is sized to receive the supporting member so that the moving body can move vertically and is coupled to the supporting member. The other passageway is sized to receive an elastic device so that the elasticity of the elastic device embeds in the passageway horizontally to clip to the supporting member so that the moving body is fixed to the supporting member. The button is movable and buckled to the moving body. When an impetus is given to the button, the button moves to collide against the elastic device so that the elastic device becomes deformed and departs from the supporting member, and then the user can shift the moving member vertically to adjust the position of the moving member connected with the supporting member.

On the basis of the adjusting device of the type mentioned above, the object of the invention is achieved by having an adjusting device installed in a supporting base, comprising the supporting member and the moving member. The supporting member has tooth-ditched outlets slanting upward at both sides. The moving member further includes the moving body, the U-clip of the elastic device, and the button, wherein the moving body can slide and is coupled to the supporting member, the U-clip has two clip parts and is fixed to the moving body, so that the two clip parts of the U-clip can catch the tooth-ditched outlets of the supporting member so that the moving body is fixed to the supporting member as the U-clip does not become deformed, and the button is installed in the moving body with mobile function, which enables the relative movement of the moving member and the supporting member by pressing the button to deform the U-clip and release the U-clip from the tooth-ditched outlets.

Other objects, features, and advantages of the invention will become apparent from the following detailed description of the preferred but non-limiting embodiments. The following description is made with reference to the accompanying drawings.

DETAILED DESCRIPTION OF THE INVENTION

The present invention provides an adjusting device comprising a foot member, a supporting member, and a moving member. The supporting member is fixed to the foot member, and the moving member includes at least a moving body, an elastic device and a button. The moving body includes two passageways, one of which is sized to receive the supporting member so that the moving body can move vertically and is coupled to the supporting member, and the other of which is sized to receive the elastic device so that the elasticity of the elastic device embeds in the passageway horizontally to clip to the supporting member so that the moving body is fixed to the supporting member. The button is movable horizontally or vertically and is buckled to the moving body, through which the user can impose a force horizontally or vertically for the adjustment.

Moreover, when an impetus is given to the button horizontally or vertically, the button moves to collide against the elastic device so that the elastic device deforms and departs from the supporting member, and then the user can shift the moving member vertically to adjust the position of the moving member connected with the supporting member. The construction and method of operating the adjusting device, however, together with additional objects and advantages thereof will be best understood from the following description of specific embodiments when read in connection with the accompanying drawings. Here a U-clip is taken as an example of the elastic device.

EXAMPLE 1

Figure 3A:
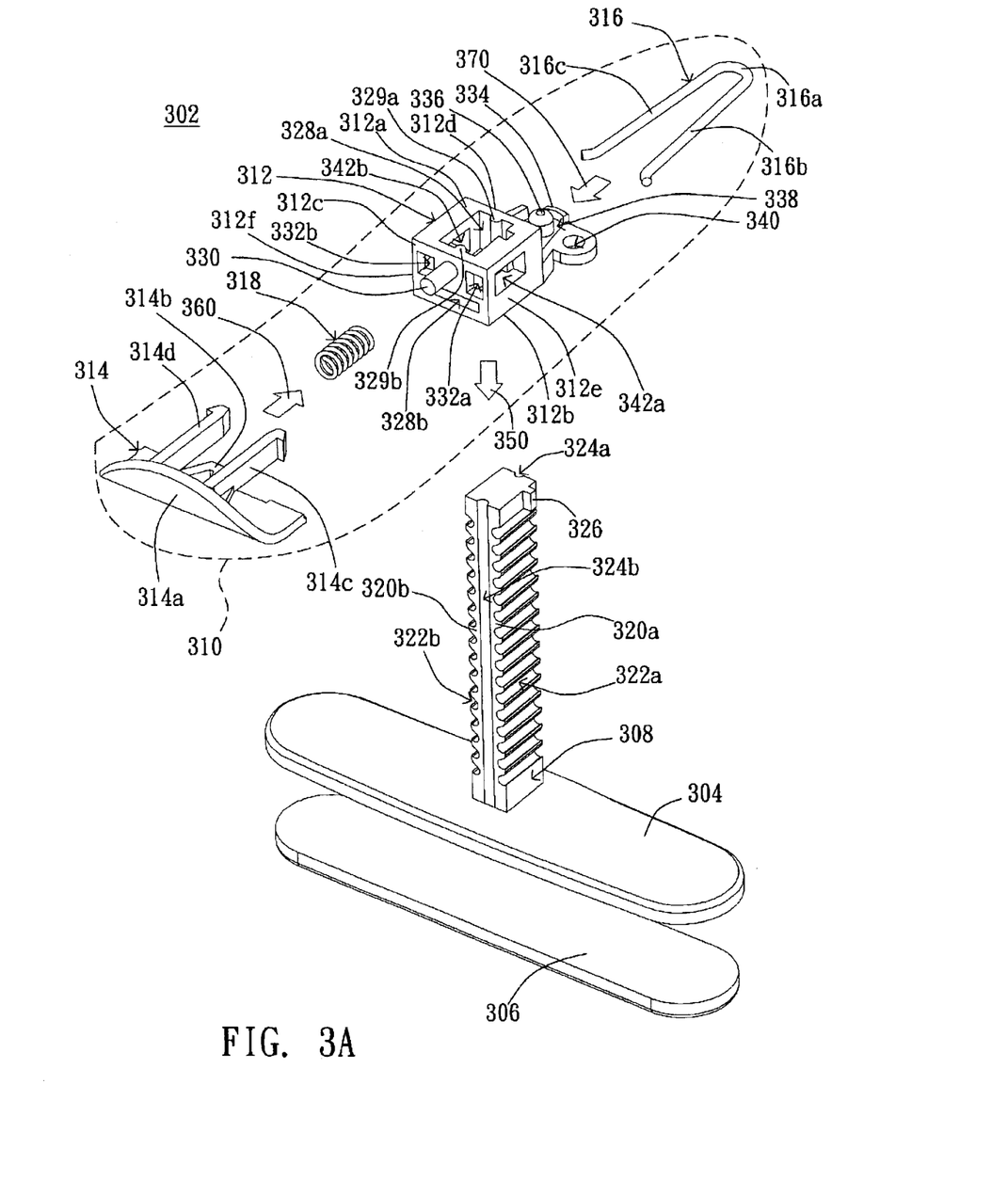
FIG. 3A shows a three-dimensional decomposition drawing of the adjusting device 302 of an embodiment of the present invention.

Referring now to the figures of the drawings in detail, and first, particularly to FIG. 3A, it shows a three-dimensional decomposition drawing of the adjusting device 302, which is equipped in the illustrated exemplary embodiment with a foot member 304, a rubber pad 306, a supporting member 308, and a moving member 310. The supporting member 308 is fixed to the foot member 304, and the moving member 310 comprising at least a moving body 312, a button 314, a U-clip 316, and a spring 318. The rubber pad 306 is set in the base of the foot member 304, so that a projector is coupled to the adjusting device 302 stably equipped on the projector plate, preventing the sliding of the projector on the plate.

The supporting member 308 is equipped with the racks 320a and 320b, which include tooth-ditched outlets 322a and 322b parallel in the opposite side of the supporting member 308. In other words, the tooth-ditched outlets have the same trend, which are perpendicular to the vertical direction of the supporting member 308. Each tooth-ditched outlet in 322a and 322b is arranged at the same distance from each other, as well as the same height relative to each other on the supporting member 308. Furthermore, the other side of the supporting member 308 is equipped with slipping ditches 324a and 324b, and a protruding part 326 above the rack 320a in the vicinity of the top of the supporting member 308.

The moving body 312 is a box shape with the top 312a opposite to the bottom 312b, the side 312c opposite to the side 312d and the side 312e opposite to the side 312f. There is a passageway 328a from the top 312a to the bottom 312b with slipping axles 329a and 329b on both opposite walls of the passageway 328a. The passageway 328a is sized to receive the supporting member 308 while the slipping axles 329a and 329b can embed in slipping ditches 324a and 324b, respectively. The moving body 312 will slide along the direction of the arrow 350 shown in FIG. 3A, backwards and forwards on the supporting member 308. Moreover, the other passageway 328b is through sides 312c and 312d of the moving body 312, which is connected and perpendicular to the other passageway 328a. Further still, the frame structure side 312c is equipped with a fixed bolt 330, which has two apertures 332a and 332b. On the other hand, the frame structure side 312d is connected with a stretched object 334 including an orientation bolt 336, a fillister 338, and an aperture 340, wherein the orientation bolt 336 is set in the fillister 338 and the fillister 338 is coupled to the passageway 328b. The moving body 312 can be fixed under a projector by using a screw to lock through the aperture 340. Furthermore, the sides 312e and 312f are equipped with receiving apertures 342a and 342b respectively, wherein the receiving apertures 342a and 342b are connected with apertures 332a and 332b.

Figure 3B:
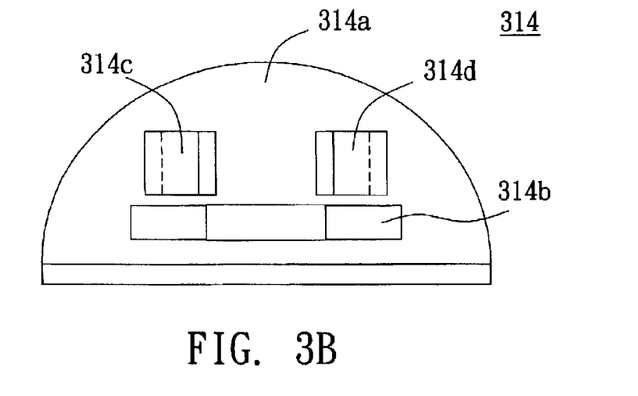
FIG. 3B shows a perspective view of the button in FIG. 3A.

The button 314 can be buckled to the side 312c of the moving body 312 along the direction of the arrow 360 in FIG. 3A by imposing a force horizontally. Simultaneously, referring to the FIG. 3B, it shows the button including a button body 314a, a propping board 314b, and hooks 314c and 314d. The propping board 314b is set on the internal side of the button body 314a in the direction parallel to the arrow 360, so that the propping board 314b is installed on the inside of the button body 314a in a manner perpendicular to the side 312c. The propping board 314b includes a narrow end and a wide end, wherein the wide end is coupled to the inward end of the button body 314a while the narrow end is approaching to the side 312c. Additionally, hooks 314c and 314d are equipped to the inside of the button body 314a, so as to connect through apertures 332a and 332b and buckle with the receiving apertures 342a and 342b, so that the button 314 is coupled to the moving body 312. Furthermore, the right end of the spring 318 is mounted to the fixed bolt 330 against the side 312c, while the left end of the spring 318 is against the inside of the button body 314a, so that the elasticity of the spring 318 enables the button 314 to maintain a certain distance with the moving body 312.

The U-clip 316 is inlaid to the stretched object 334 of the moving body 312 along the direction of the arrow 370 in FIG. 3A. The U-clip 316 includes a curved part 316a and clip parts 316b and 316c, wherein the curved part 316a is set inside the fillister 338 and buckled to the fixed bolt 336, and the clip parts 316b and 316c are parallel and connected to both sides of the curved part 316a, with coupling through the passageway 328b. When the button 314 is buckled to the moving body 312 in the natural status, the narrow end of the propping board 314b is positioned between the clip parts 316b and 316c. In addition, the clip parts 316b and 316c are wedged in the tooth-ditched outlets 322a and 322b of the racks 320a and 320b, respectively, so that the moving member 310 is fixed to the supporting member 308.

Figure 4A:
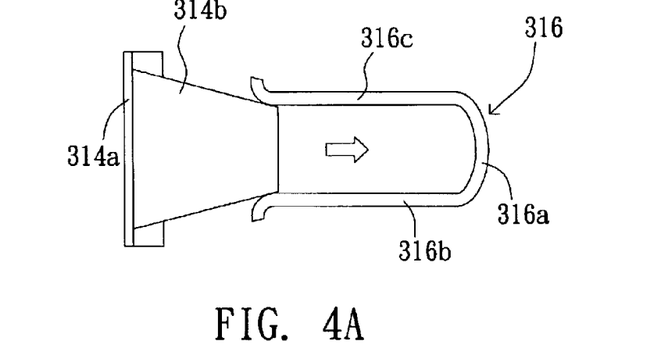
FIG. 4A shows a perspective view of the propping board and both clip parts in FIG. 3A.

Particularly, the thickness and shape of the clip parts 316b and 316c must match those of the tooth-ditched outlets 322a and 322b, and the distance between the clip parts 316b and 316c should be the same as the distance between the tooth-ditched outlets 322a and 322b. And also, the clip part 316b parallels the clip part 316c in the natural status, so that the narrow end of propping board 314b is exactly located between clip parts 316b and 316c. As a result, the clip parts 316b and 316c are buckled to the racks 320a and 320b as shown in FIG. 3A, respectively. The detailed drawings of the propping board and both clip parts in FIG. 3A are shown in FIG. 4A. Obviously, both ends of the clip parts 316b and 316c bend outward to prevent the attrition of the propping board 314b, which may cause holding failure of the propping board 314b. When the button body 314a and the propping board 314b are pushed, they move along the direction as shown by the arrow 450 in FIG. 4A. And then the clip parts 316b and 316c move relatively toward the wide end of the propping board 314b, and are held apart by the propping board 314b for an angle θ. As a result, the clip parts 316b and 316c depart from the racks 320a and 320b and the moving member 310 can slide opposite to the supporting member 308.

Figure 4B:
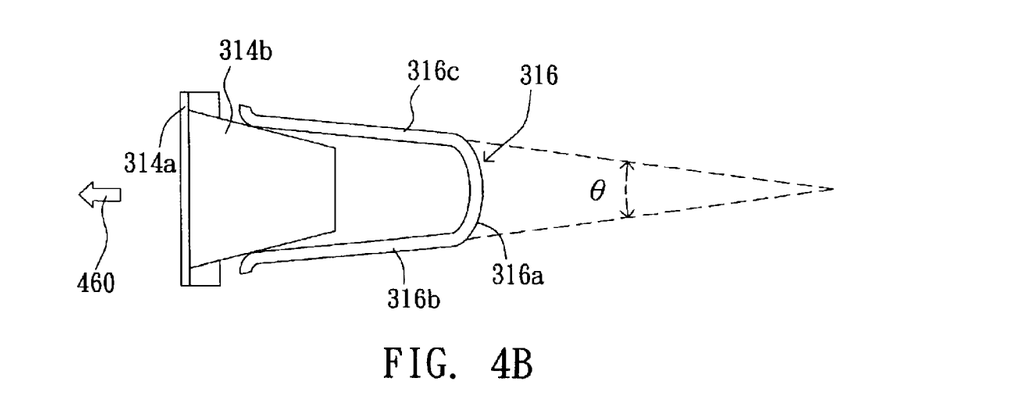
FIG. 4B shows a perspective view of the propping board and both clip parts in FIG. 4A.

When the force on the button body 314a is released, the button body 314a and the propping board 314b move along the direction of the arrow 460 due to the elasticity of the spring 318, so that the propping board 314b and the clip parts 316b and 316c move oppositely, as shown in FIG. 4B. That is, the clip parts 316b and 316c move along from the wide end toward the narrow end and then return to the original parallel status. As shown in FIG. 4A, the clip parts 316b and 316c are buckled to the racks 320a and 320b, respectively.

Figures 5, 6:
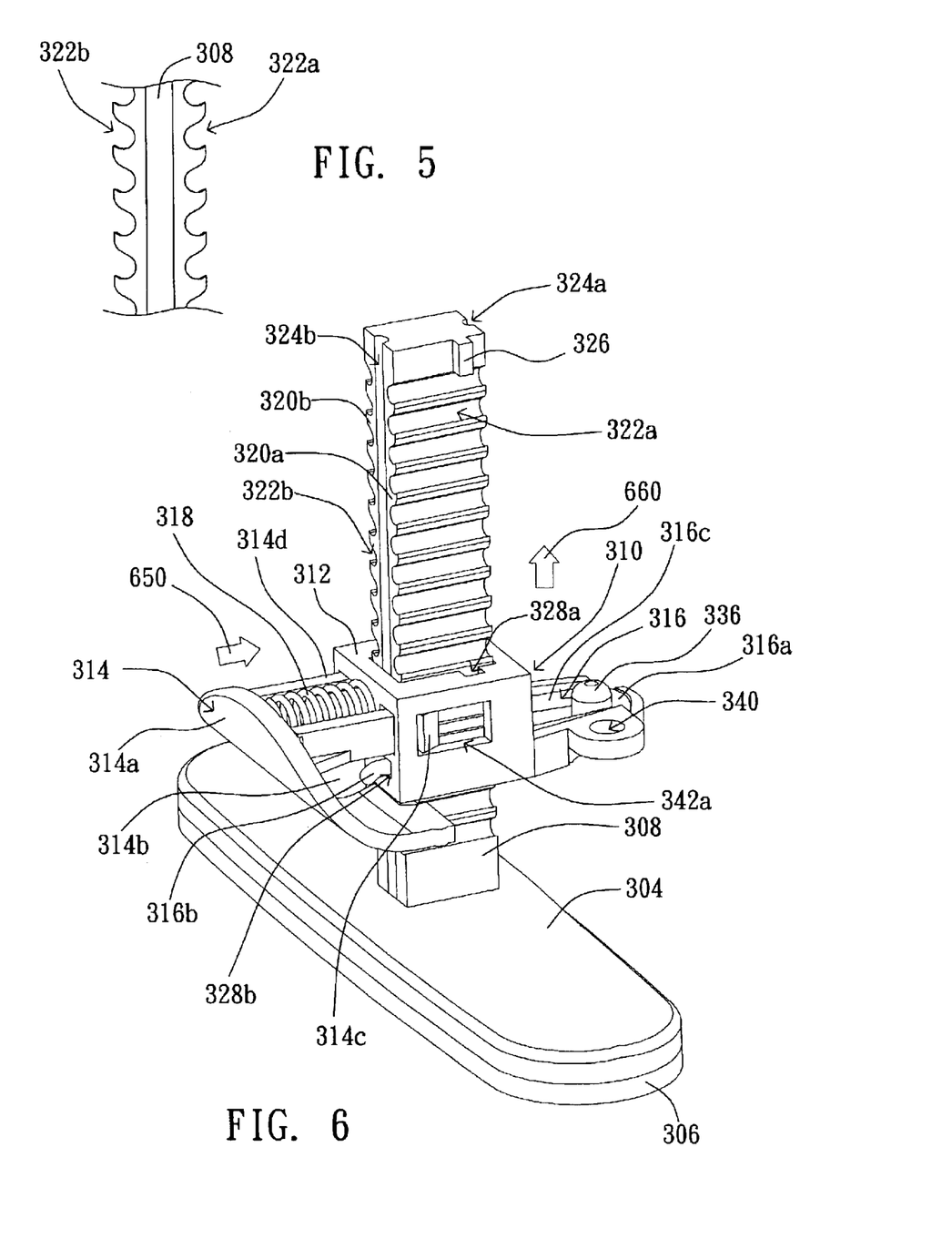
FIG. 5 shows a perspective view of the tooth-ditched outlets of the present invention.
FIG. 6 shows the composition of an adjusting device of an embodiment of the present invention.

Furthermore, in order to strengthen the buckling of the clip parts 316b and 316c to the racks 320a and 320b, a specific design of the shape and model of the tooth-ditched outlets 322a and 322b is applied, as shown in FIG. 5. The tooth-ditched outlets 322a and 322b are well designed with outlets slanted upward to ensure a strong buckling effect of the clip parts 316b and 316c to the racks 320a and 320b.

Referring to FIG. 6, the components of an adjusting device are shown. As mentioned above, a user can push the button 314 along with the direction of the arrow 650 in FIG. 6, so that the propping board 314b can hold open the clip parts 316b and 316c, and then the clip parts 316b and 316c move along from the narrow end to the wide end, enabling the clip parts 316b and 316c to disengage from the racks 320a and 320b, wherein the clip parts 316b and 316c form a propping angle θ as depicted in FIG. 4B. Subsequently, the user can make the moving member 310 slide upward and downward along the direction of the arrow 660 in FIG. 6 to adjust the angle of elevation of a projector on the projector plate. Meanwhile the supporting member 308 can move in and out of a fillister under the projector, relatively. When the moving member 310 slides to the top of the supporting member 308, a protruding part 326 will lock it so as to prevent it from disengaging.

Accordingly, as the user adjusts the moving member 310 to a required location and fixes the angle of elevation of a projector, the user can release the force from the button 314 so that the elasticity of a spring 318 makes the button 314 return to the origin location, and the propping board 314b moves along with the button body 314a to remove from the moving body 312. Finally, the clip parts 316b and 316c will move along the propping board 314b from the wide end to the narrow end, relatively, so that the clip parts 316b and 316c connect to the racks 320a and 320b, respectively. Therefore, the clip parts 316b and 316c recover to the original parallel status.

Consequently, the invention is very advantageous in that it reduces the force required of the user and saves time by pressing the button 314 horizontally to adjust the elevation of a projector on the projector plate, and also, the adjusting device 302 can be installed in any other electronic products and portable small size and weight electronic products required to adjust the elevation.

EXAMPLE 2

Figure 7A:
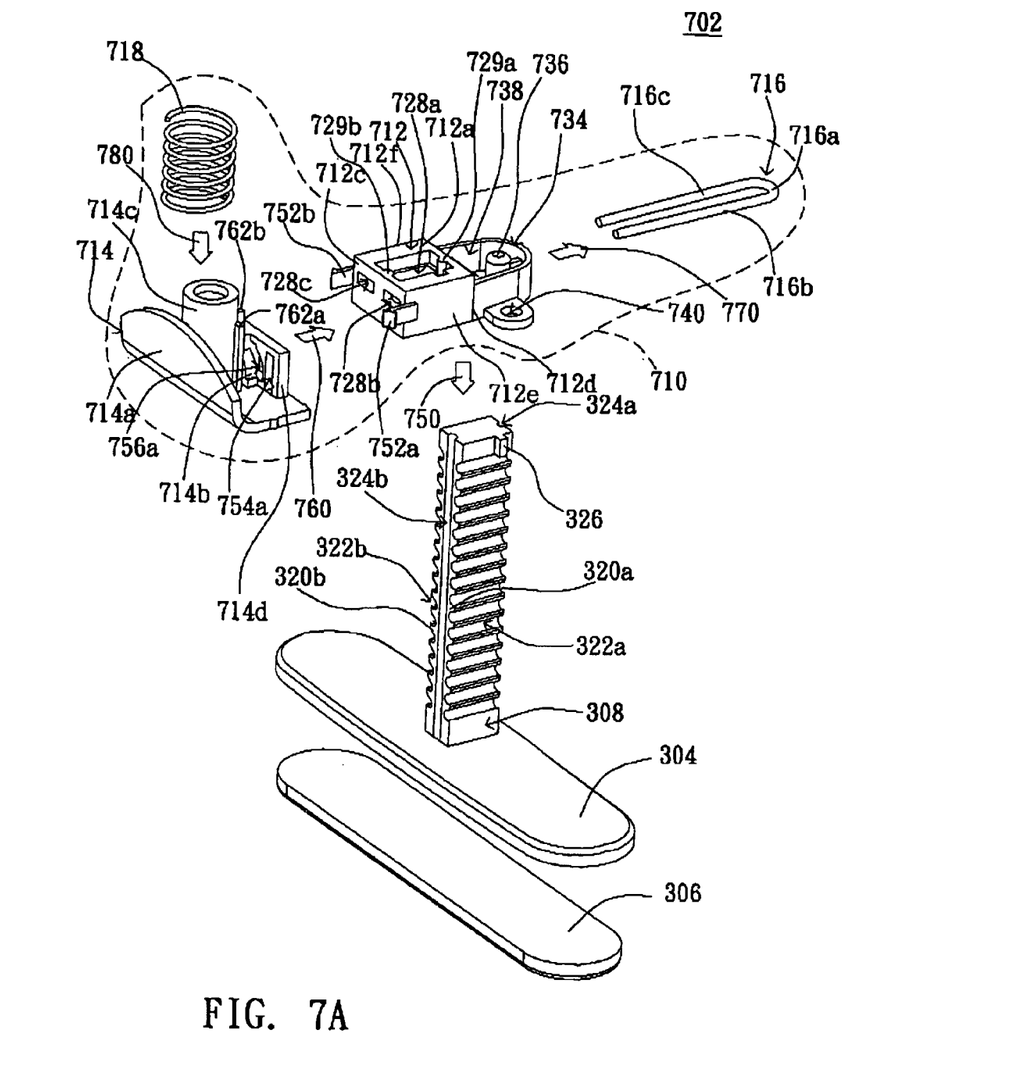
FIG. 7A shows a perspective view of the adjusting device of an alternative preferred embodiment of the present invention.

Referring to FIG. 7A, a perspective view of the adjusting device in an alternative preferred embodiment is shown. The differences between the two preferred embodiments of the adjusting devices 302 (shown of FIG. 3A) and 702 are the moving member 710 and the force direction on the button 714. Other devices such as the foot member 304, the supporting member 308, and the rubber pad 306 of the adjusting device 702 are the same as those of the adjusting device 302, and so the operation of the adjusting devices 702 and 302 is identical.

The moving member 712 includes a moving body 712, a button 714, a U-clip 716 and a spring 718. The moving body 712 is a box shape with the top 712a opposite to the bottom 712b, the side 712c opposite to sides 712d and the side 712e opposite to the side 712f. There is a passageway 728a from the top 712a to the bottom 712b with the slipping axles 729a and 729b on both opposite walls of the passageway 728a. The passageway 728a is sized to receive the supporting member 308 so that the slipping axles 729a and 729b can be embedded in the slipping ditches 324a and 324b, respectively. The moving member 712 will slide along the direction of the arrow 750, as shown in FIG. 7A, backwards and forwards on the supporting member 308.

Moreover, the passageways 728b and 728c go through the sides 712c and 712d, which are connected and perpendicular to the passageway 728a. Further still, the frame structure side 712d is equipped with a stretched object 734 including a fixed bolt 736, a fillister 738, and an aperture 740, with the fixed bolt 736 located inside the fillister 738. The fillister 738 is interlinked with passageways 728b and 728c, so that the moving body 712 can be fixed under a projector by using a screw to lock through the aperture 740. On the other hand, the frame structure sides 712e and 712f are equipped with the hooks 752a and 752b, wherein both hooks are parallel and protruding outward of the side 712c, so as to buckle to the button 714.

Figure 7B:
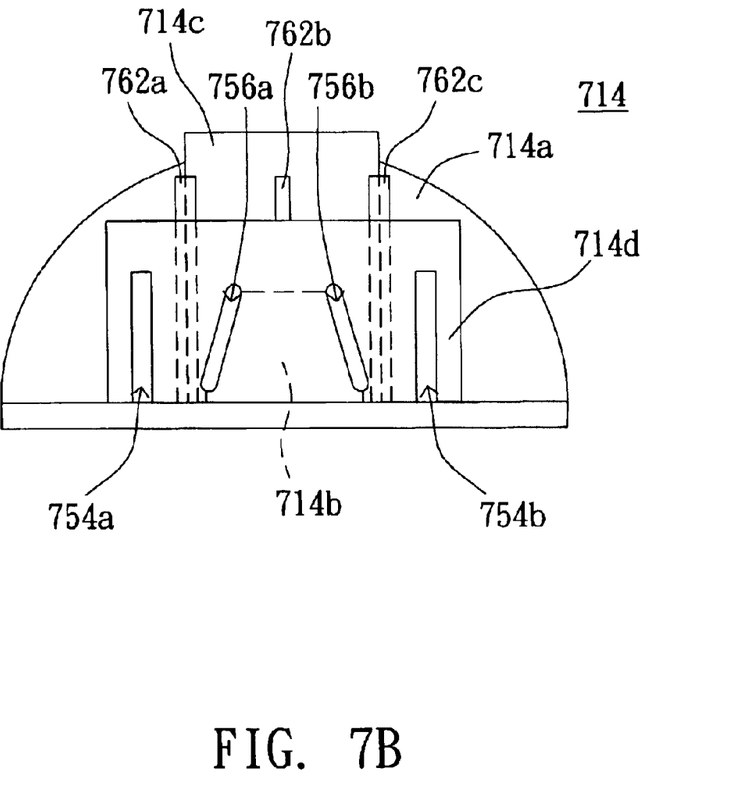
FIG. 7B shows a perspective view of the button in FIG. 7A.

Referring to FIG. 7B, the button 714 shown includes a button body 714a, a propping board 714b, an hollow bolt 714c, and a buckling board 714d. The user can operate the button 714 by pushing the button body 714a along the direction of the arrow 760 in FIG. 7A to buckle to the side 712c. The propping board 714b is located inside the button 714a, which is perpendicular to the direction of the arrow 760 and parallel to the side 712c. The propping board 714b is equipped with one wide end and one narrow end, with the wide end connected to the button 714a. The hollow bolt 714c is located between the propping board 714b and the button 714a, with a spring 718 against protruding objects 762a, 762b, and 762c, which can be locked under a projector by a screw. The top of the spring 718 is against the projector so that the elasticity maintains a certain distance between the button 714 and the projector.

Furthermore, the buckling board 714d is parallel to the propping board 714b including the buckling apertures 754a and 754b, and the slipping ditches 756a and 756b. The propping board 714b is located between the hollow bolt 714c and the buckling board 714d. The buckling apertures 754a and 754b are connected with the hooks 752a and 752b respectively, so as to couple the button 714 to the moving body 712. The slipping ditches 756a and 756b are located on the buckling board 714d along both sides of the propping board 714b corresponding to the apertures of the passageways 728b and 728c on the side 712c.

The U-clip 716 is inlaid to the stretched object 734 of the moving member 712 along the direction of the arrow 770 in FIG. 7A. The U-clip 716 includes a curved part 716a, and the clip parts 716b and 716c, wherein the curved part 716a is set inside the fillister 738 and is buckled to the fixed bolt 736, and the clip parts 716b and 716c are parallel and connected to both sides of the curved part 716a, with coupling through the passageways 728b and 728c. When the button 714 is buckled to the moving member 712 in the natural status, the clip parts 716b and 716c move through the slipping ditches 756a and 756b respectively so that the ends of the clip parts 716b and 716c are located in both sides of the propping board 714b. In addition, the clip parts 716b and 716c are wedged in the tooth-ditched outlets 322a and 322b of the racks 320a and 320b, respectively, so that the moving member 702 is fixed to the supporting member 308.

Figure 8A:
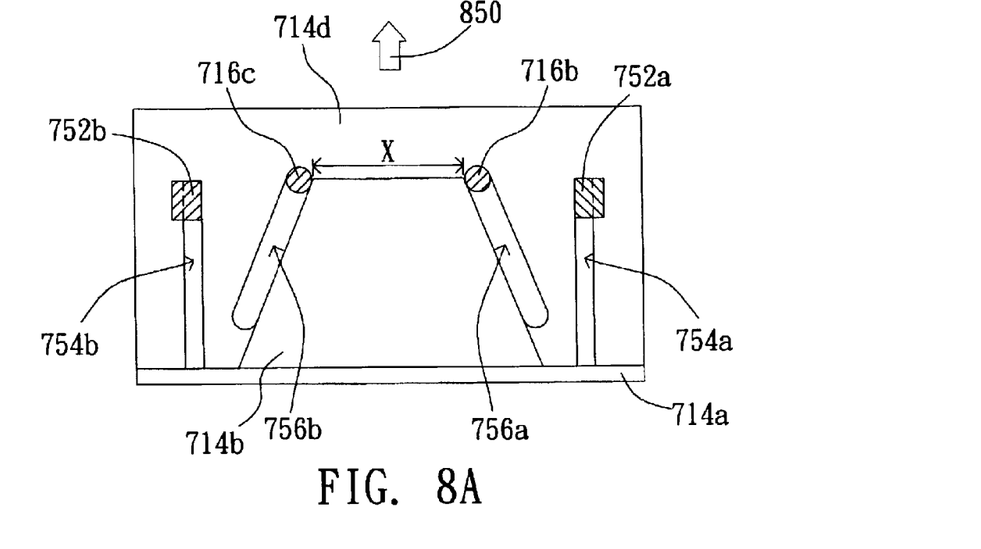
FIG. 8A shows a perspective view of the propping board and both clip parts in FIG. 7A.
Figure 8B:
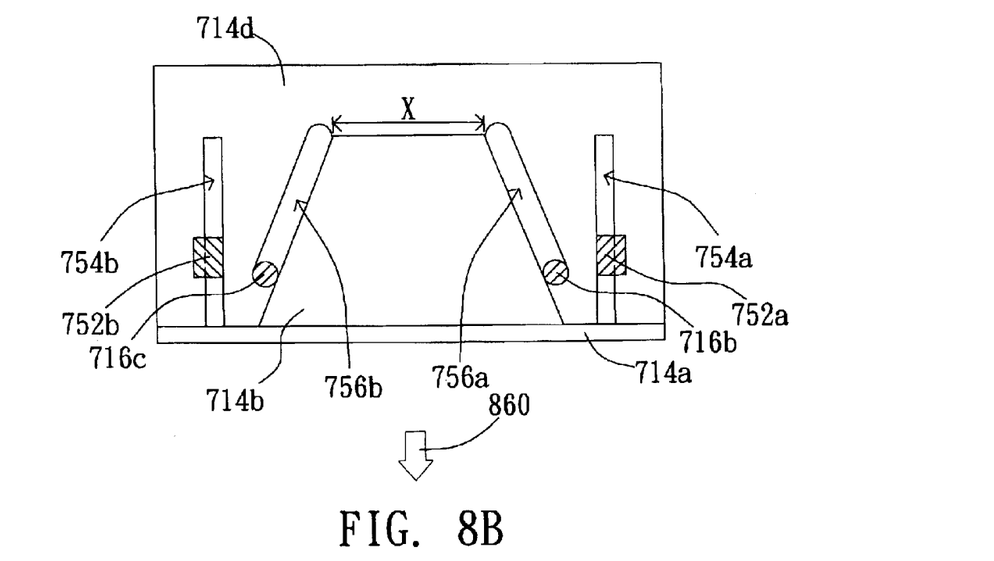
FIG. 8B shows a perspective view of the propping board and both clip parts in FIG. 8A.

Particularly, the thickness and shape of the clip parts 716b and 716c must match the tooth-ditched outlets 322a and 322b respectively, and the distance between the clip parts 716b and 716c should be the same as the distance between the tooth-ditched outlets 322a and 322b, and also, the same as the above line X of the propping board 714b. As a result, the clip parts 716b and 716c are coupled to the racks 320a and 320b, and the hooks 752a and 752b are coupled to the buckling apertures 754a and 754b, respectively, as shown in FIG. 8A. When the user imposes a force on the button body 714a vertically and the propping board 714b, both move along the direction of the arrow 850 in FIG. 8A, and then the clip parts 716b and 716c move oppositely from the narrow end toward the wide end of the propping board 714b. Meanwhile, the hooks 752a and 752b move from the top of the buckling apertures 754a and 754b toward the bottom, so that the propping board 714b wilt hold the clip parts 716b and 716c to depart from the racks 320a and 320b, respectively, as shown in FIG. 8B. When the user removes the force from the button body 714a, the button body 714a and the propping board 714b move along the direction of the arrow 860 due to the elasticity of the spring 718, 50 that the clip parts 716b and 716c move oppositely from the wide end toward the narrow end of the propping board 714b and recover to original status, along with the hooks 752a and 752b moving from the bottom of the buckling apertures 754a and 754b toward the top, referring to FIG. 8B. Thus, the clip parts 716b and 716c is connected with the racks 320a and 320b and then return to the original parallel status. Furthermore, in order to strengthen the buckling between the clip parts 716b and 716c with the racks 320a and 320b shown in FIG. 7A, the invention incorporates a specific design of the shape and model of the tooth-ditched outlets 322a and 322b, as shown in FIG. 5. As mentioned above, the design ensures the strong buckling effect of the clip parts 716b and 716c to the racks 320a and 320b.

Figure 9:
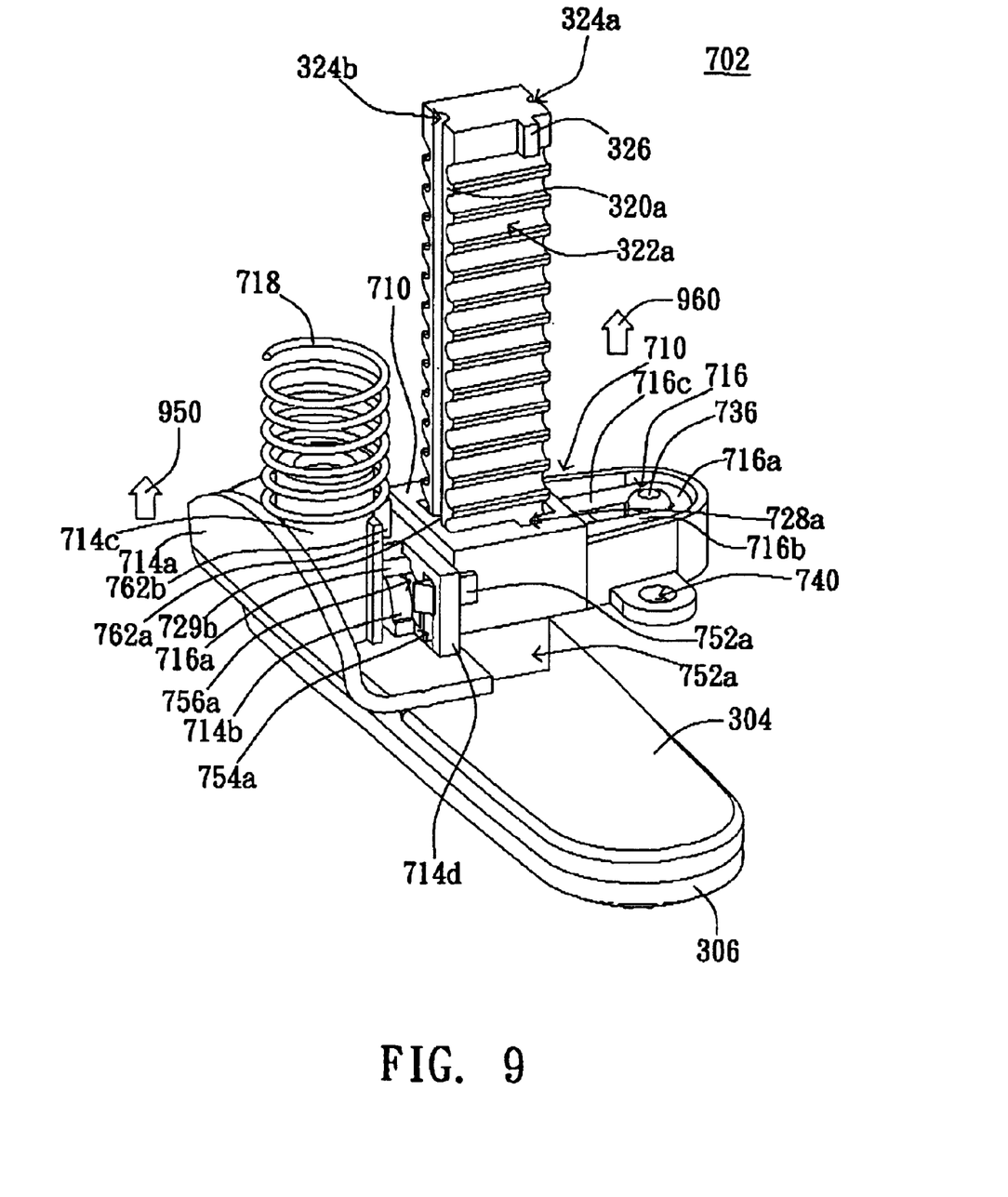
FIG. 9 shows the composition of an adjusting device of an alternative preferred embodiment of the present invention.

Referring to FIG. 9, the construction of the perspective view of an alternative adjusting device is shown. The user can use two screws to lock through the aperture 740 and the hollow bolt 714c under a projector to fix the moving member 710 and the button 714 under the projector, so that the adjusting device 702 is fixed to the projector. When adjusting the elevation of the projector on the plate, firstly the button body 714a together with the button 714 is pushed along with the direction of the arrow 950 in FIG. 9, so that the propping board 714b moves upward with the button body 714. Next, the propping board 714b can hold apart the clip parts 716b and 716c, enabling the clip parts 716b and 716c to disengage from the racks 320a and 320b. Subsequently, the user can make the moving member 710 slide upward and downward along the direction of the arrow 960 in FIG. 9 to adjust the angle of elevation of a projector on the plate, and the supporting member 308 can move in and out of a fillister under the projector, relatively. When the moving member 710 slides to the top of the supporting member 308, the protruding part 326 will lock it so as to prevent it from disengaging.

Accordingly, as the user adjusts the moving member 710 to the desired location and fixes the angle of elevation of a projector, the user can release the force from the button 714 so that the elasticity of the spring 718 makes the button 714 return to the original location, and the propping board 714b moves downward with the button body 714a. Ultimately, the clip parts 716b and 716c will recover to original distance, so that the clip parts 716b and 716c catch onto the tooth-ditched outlets 320a and 320b, respectively. Therefore, the moving member 710 is fixed to the supporting member 308 and the clip parts 316b and 316c recover to the original parallel status.

Consequently, the invention is very advantageous in that it reduces the time and effort required of the user, by allowing the user to press the button 714 to adjust the elevation of a projector on the plate. Additionally, the adjusting device 702 can be applied in other electronic products and even in portable, compact electronic products that also require elevation adjustments.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An adjusting device comprising:
   a supporting member; and
   a moving member including
      a moving body having a first passageway and a second passageway, wherein the first passageway is sized to receive the supporting member so that the moving body moves vertically on the supporting member;
      an elastic device with two elastic arms passing through the second passageway, wherein the second passageway is sized to receive the elastic device, and wherein the two elastic arms are for clipping the supporting member so that the moving body is fixed to the supporting member; and
      a button, which is movably buckled to the moving body, wherein while the button is pushed to expand the two elastic arms of the elastic device, the two elastic arms bend outward and unclip the supporting member so that the moving member is vertically shifted to adjust a position of the moving body on the supporting member.

2. The adjusting device as claimed in claim 1, wherein the supporting member is equipped with a first rack and a second rack in both sides respectively, and the first rack has a plurality of first tooth-ditched outlets and the second rack has a plurality of second tooth-ditched outlets opposite to the first ditched outlets.

3. The adjusting device as claimed in claim 2, wherein the elastic device is a U-clip of "U" shape with the two elastic arms, which respectively get stuck to one of the first tooth-ditched outlets and one of the second tooth-ditched outlets, so that the U-clip clips the first rack and the second rack.

4. The adjusting device as claimed in claim 3, wherein each of the first tooth-ditched outlets and the second tooth-ditched outlets slants upward.

5. An adjusting device comprising:
   a supporting member, wherein the supporting member is equipped with a first rack and a second rack in both sides respectively, and the first rack has a plurality of first tooth-ditched outlets and the second rack has a plurality of second tooth-ditched outlets opposite to the first ditched outlets; and
   a moving member including:
      a moving body having a first passageway and a second passageway, wherein the first passageway is sized to receive the supporting member so that the moving body moves vertically on the supporting member;
      an elastic device, wherein the second passageway is sized to receive the elastic device, and wherein the elastic device is a U-clip of "U" shape with two elastic arms, which respectively get stuck to one of the first tooth-ditched outlets and one of the second tooth-ditched outlets, so that the U-clip clips the first rack and the second rack and the moving body is fixed to the supporting member; and
      a button, which is movably buckled to the moving body, the button including:
         a button body for being imposed by a lateral force to push the button; and
         a propping board having a narrow end and a wide end, wherein the wide end is coupled to the button body, the narrow end is located between the two elastic arms of the U-clip in a natural state, and the propping board is provided to hold open the U-clip complying with a lateral movement of the button;
      wherein while the button body is laterally enforced and the button is pushed, the two elastic arms of the U-clip move relatively from the wide end toward the narrow end of the propping board, with the wide end propping up the two elastic arms of the U-clip, and the U-clip disengaging from the first rack and the second rack so that the moving member is vertically shifted to adjust a position of the moving body on the supporting member.

6. The adjusting device as claimed in claim 3, wherein the button comprises:
   a button body for imposing a vertical force to move the button;
   a propping board comprising a narrow end and a wide end, wherein the wide end is coupled to the button body, the narrow end is located between the two arms of the U-clip in a natural state; and the propping board is provided to hold open the U-clip complying with a vertical movement of the button; and
   a buckling board located at the button body and adjacent to the propping board, comprising a first slipping ditch and a second slipping ditch, wherein the first slipping ditch and the second slipping ditch are ditched at the buckling board along both sides of the propping board, so that the two arms of the U-clip go through the first slipping ditch and the second slipping ditch against both sides of the propping board;
   wherein while the button body is vertical enforced and the button is pushed, the two arms of the U-clip move relatively from the narrow end toward wide end of the propping board, with the wide end propping up the two arms of the U-clip, and the U-clip disengaging from the first rack and the second rack.

7. An adjusting device able to be positioned at a base of a supporting object, comprising:
   a supporting member with a tooth-ditched outlet; and
   a moving member, including:
      a moving body movably coupled to the supporting member;
      an elastic device at the moving body, wherein the elastic device has two elastic arms stretching out of the moving body for clipping the tooth-ditched outlet so that the moving body is fixed to the supporting member; and
      a button movably located at the moving body, wherein while the button is pressed to expand the two elastic arms of the elastic device, the two elastic arms bend outward and unclip the tooth-ditched outlet so that the moving body moves relatively to the supporting member.

8. The adjusting device as claimed in claim 7, wherein the tooth-ditched outlet slants upward.

9. The adjusting device as claimed in claim 7, wherein the elastic device is a U-clip of "U" shape with the two elastic arms, and wherein while the elastic device is un-deformed, at least one of the two elastic arms gets stuck to the tooth-ditched outlet.

10. An adjusting device able to be positioned at a base of a supporting object, comprising:
    a supporting member with a tooth-ditched outlet; and a moving member, including:
- a moving body movably coupled to the supporting member;
- an elastic device at the moving body, wherein the elastic device is a U-clip of "U" shape with two elastic arms for clipping the tooth-ditched outlet so that the moving body is fixed to the supporting member; and
- a button movably located at the moving body, wherein the button includes a propping board with a narrow end located between the two elastic arms, wherein while the button is pushed, the wide end moves toward the two elastic arms to hold open the two elastic arms and then the two elastic arms unclip the tooth-ditched outlet so that the moving body moves relatively to the supporting member.

11. The adjusting device as claimed in claim 9, wherein the button comprises:

a buckling board, wherein the buckling board comprises a first slipping ditch and a second slipping ditch, with the two arms through the first slipping ditch and the second slipping ditch respectively; wherein relative to the second slipping ditch, the first slipping ditch comprises a nearer location and a farther location; and wherein while the button is pushed, the elastic device moves from the nearer location to the farther location to prop up the two arms of the elastic device and then the elastic device disengages from the tooth-ditched outlet.

* * * * *